June 20, 1961  R. B. STELZER  2,989,234
ELECTRICAL ANALOGUE
Filed July 30, 1956  3 Sheets-Sheet 1
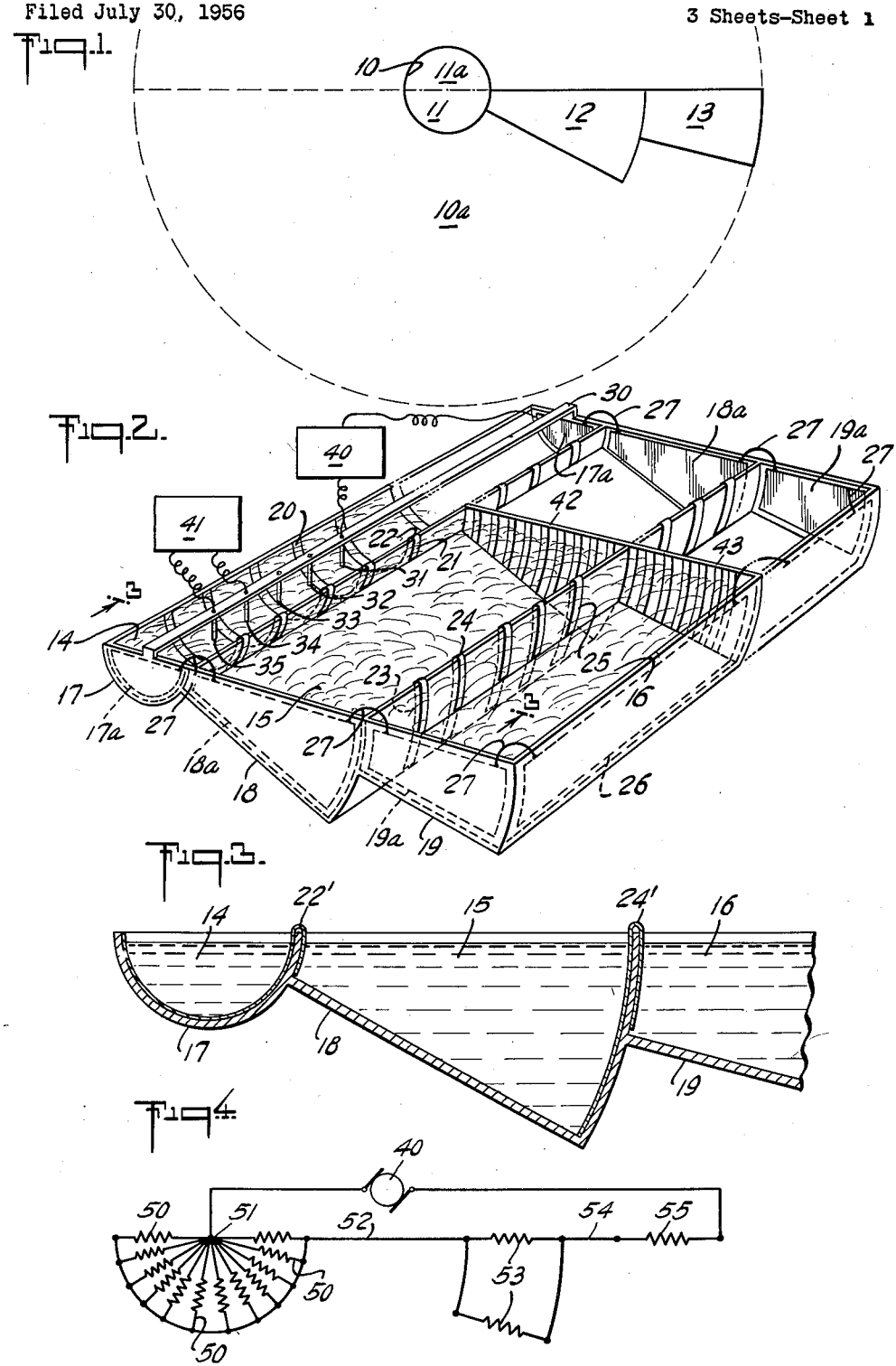

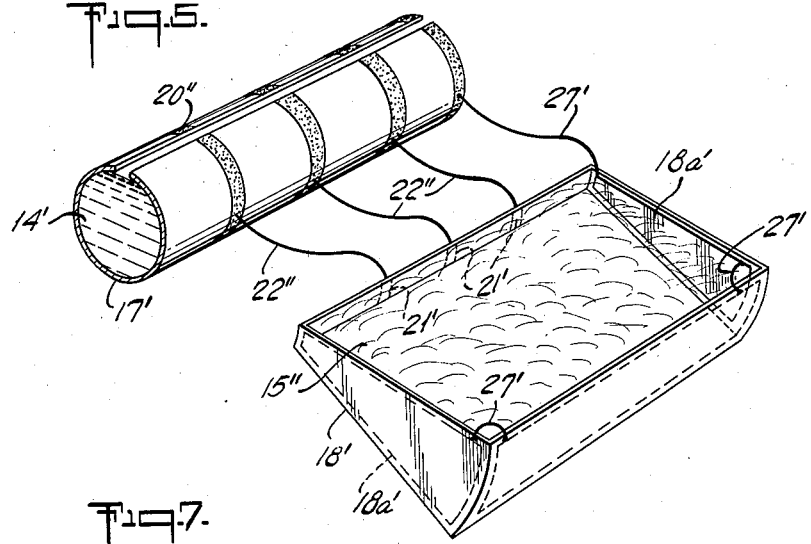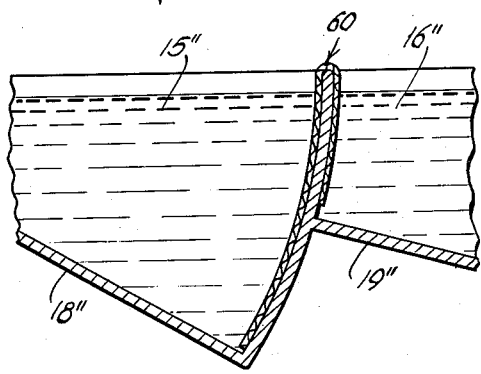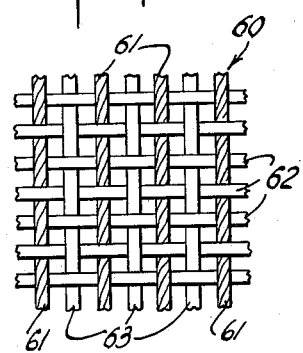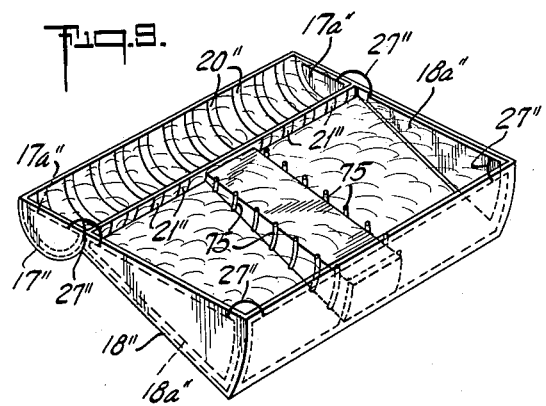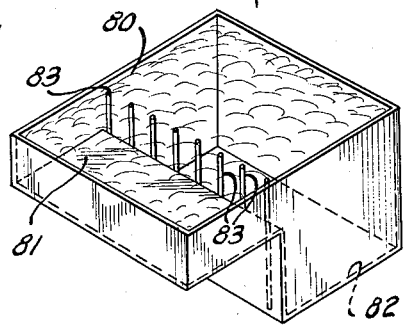

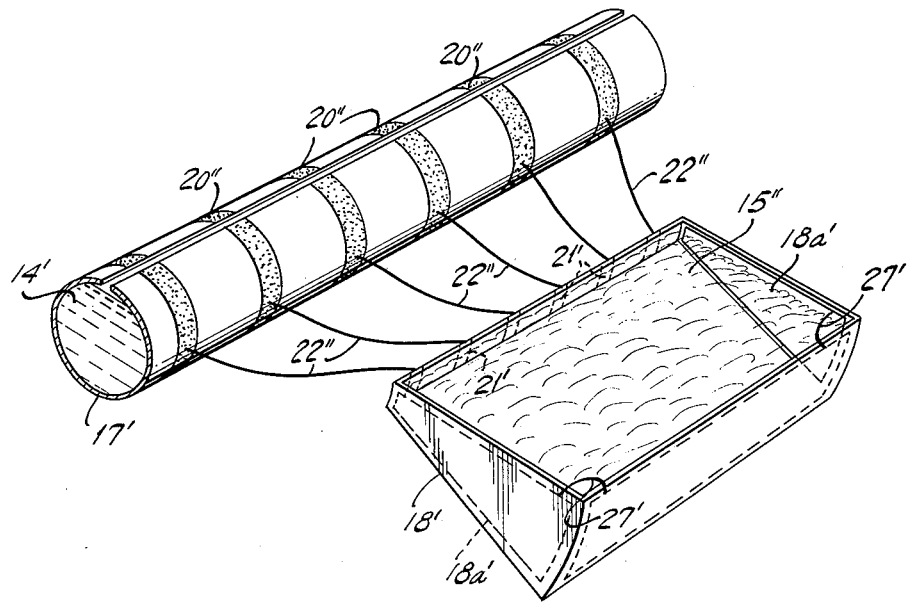
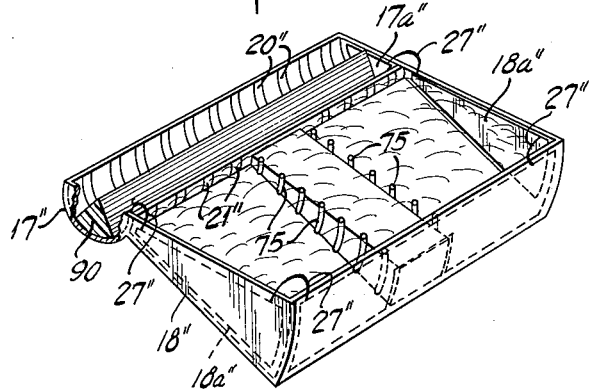

United States Patent Office 2,989,234
Patented June 20, 1961

2,989,234
ELECTRICAL ANALOGUE
Roland B. Stelzer, Bellaire, Tex., assignor to Texaco Inc., a corporation of Delaware
Filed July 30, 1956, Ser. No. 600,792
13 Claims. (Cl. 235—61.6)

The present invention relates generally to improvements in electrical analogue apparatus; and, more particularly, the invention is concerned with improvements in potentiometric model apparatus. The invention is of particular utility in relation to potentiometric model apparatus of the type employed to represent a well bore, together with a surrounding earth formation.

As is well known, various physical properties of mechanical and electrical systems that obey Laplaces equation, at least approximately, may be investigated through the use of electrical analogue apparatus. In the case of a potentiometric model of a well bore and surrounding earth formation(s), for example, the bore hole including its fluid contents and surrounding earth formations may be represented by electrolyte pools and various electric currents may be applied to the pools and potential measurements made in order to determine various characteristics of the system. Such a system is shown, for example in U.S. Patent 2,547,950, issued April 10, 1951, to B. D. Lee and Gerhard Herzog.

In accordance with prior-art, potentiometric models, such as those discussed in the above-referenced patent to Lee and Herzog, the shape of the apparatus is such that the bore hole and adjacent earth formations are represented as successive portions of a wedge-shaped electrolyte system, corresponding to a comparatively small sector of the bore hole and formation with the apex of the sector running through the mid-point or axis of the bore hole. In the model, for purposes of convenience, the bore hole and formation are turned through 90°, thus, the axis of the bore hole runs along a horizontal line, rather than the vertical position of the normal well bore. The electrolyte pool representing the bore hole usually comprises a narrow and usually shallow pool with the formation pool being represented by an adjacent, deeper and larger pool separated therefrom by a barrier which permits electric currents to be produced across it at a plurality of discrete points throughout its length, but not longitudinally thereof, in such manner that the establishment of an equi-potential surface or boundary is avoided along the barrier. Barriers of this same general type are also employed to divide the formation pool into a plurality of separate portions along the axis of the bore hole in order to represent different strata or types of formation; that is, the pool may be varied as desired in order to simulate various types of formation. Means are provided for maintaining a plurality of electrodes along the bore hole pool, preferably along a line representing the axis of the bore hole, and means are provided for applying various electric currents to certain of the electrodes and measuring the resultant potential difference produced between various points in the system as means for analyzing the electric characteristics of the system.

The above-described wedge-shaped apparatus affords the advantage of being comparatively compact, as contrasted with a more complete representation of the bore hole and formation by means of electrolyte pools of 360° arcs as in the case of an actual bore hole and surrounding formation. However, the use of a wedge-shaped model introduces problems of undue sensitivity as regards the placing of electrodes along the axis of the bore hole. Very slight displacements or irregularities in these electrodes, or in the line of intersection between the bottom of the model and the surface of the electrolyte, readily destroy the symmetry of their location in the system and very often reduce the effectiveness and reliability of the information desired. Accordingly, it is an object of the present invention to provide improvements in potentiometric model apparatus wherein the convenience of operation and compactness of the wedge-type apparatus is retained and which, nevertheless, affords improved accuracy of measurement.

It is another object of the present invention to provide an improved potentiometric model apparatus that affords the advantages of the aforementioned wedge-shaped apparatus, but which, nevertheless, is of reduced size and weight as compared with the conventional apparatus.

It is still another object of the invention to provide an improved potentiometric model apparatus that is comparatively less sensitive to the evaporation of electrolyte during the course of a series of measurements than the conventional wedge-shaped apparatus.

In accordance with a further object, there is provided means for electrically bridging the barrier dividing the separate electrolyte pools of a potentiometric model.

Briefly stated, in accordance with one aspect of the invention, there is provided a potentiometric model comprising adjacent pools of electrolyte representative of a radial system to be studied, such as a bore hole through one or more earth formations, and wherein one of said pools is maintained within a container of generally cylindrical configuration, or a lesser segment thereof, and wherein an adjacent portion of the system is represented by a pool of electrolyte within a container comprising a generally annular segment of an adjacent radial portion of the system and wherein the annular segment subtends a significantly fewer number of radians than the first pool. The first pool is contacted by a plurality of discrete electrodes disposed along the inner surface of the generally cylindrical wall of the container and electrically coupled to a corresponding plurality of electrodes that are disposed along the mating surface of the second electrolyte pool. Preferably, the invention is further characterized in that the conductivity of the second pool is increased in relation to the first pool by a factor proportional to the number of radians subtended by the first pool as compared with that of the second pool. Thus, for the case of homogeneous resistivity the ratio of the absolute conductivity of the two pools is equal to the aforementioned factor of proportionality.

In accordance with another aspect of the invention, adjacent portions of a system under study, such as adjacent earth formations, may be represented by means of an electrolyte pool having regions of different depth that are electrically coupled by means of common electrical bridging members. The bridging members may be in the form of electrodes extending from the surface of the electrolyte to the bottom of the deeper of the two adjacent regions of different depth located along the plane where the two regions join.

In accordance with a further aspect of the invention, the electrodes bridging the respective pools are comprised of substantially parallel members of a bridging cloth whose transverse members are comprised of nonconductive material.

For additional objects and advantages and for a better understanding of the invention, attention is now directed to the following description and accompanying drawings. The features of the invention which are believed to be novel are particularly pointed out in the appended claims.

Referring now to the drawings:

FIGURE 1 is a diagrammatic representation of a portion of an earth bore and surrounding earth formation as seen from above;

FIGURE 2 is a perspective view of a potentiometric model apparatus representative of the portion of an earth bore hole and formation shown in FIGURE 1, and embodying features of the invention;

FIGURE 3 is a cross-sectional view of a potentiometric model apparatus like that shown in FIGURE 2, taken along a line corresponding to the line 3—3 of FIGURE 2, but showing another form of electrode member coupling the barriers;

FIGURE 4 is a schematic circuit diagram illustrating an equivalent circuit of a cross-sectional plane taken through the apparatus of FIGURE 2;

FIGURE 5 is a perspective view of another form of potentiometric model apparatus embodying features of the invention;

FIGURE 6 is a perspective view of another form of potentiometric model apparatus similar to that of FIGURE 5, but embodying further features of the invention;

FIGURE 7 is a detailed, cross-sectional view showing a portion of a potentiometric model apparatus similar to that of FIGURE 3, but embodying further features of the invention;

FIGURE 8 is a detailed view showing a form of electric bridging member in accordance with the invention as shown in FIGURE 7;

FIGURE 9 is a perspective view of a potentiometric model apparatus representative of an earth bore hole and surrounding formations, and embodying further features of the invention;

FIGURE 10 is a perspective view of a potentiometric model apparatus further illustrating novel aspects of the invention as shown in FIGURE 9; and, FIGURE 11 is a perspective view of a potentiometric model apparatus similar to that of FIGURE 9 and embodying still further features of the invention.

Throughout the various figures of the drawings corresponding elements may be identified by identical reference numerals, distinguished by prime marks.

Referring now to FIGURE 1, there is shown a representation in plan view, showing a bore hole 10 through the surface of the earth 10a. The bore hole 10, including the usual fluid contents, is sub-divided along its axis into two semi-cylindrical portions 11 and 11a, each of which subtends 180° at the center of the bore hole 10. The earth formation adjacent the lower semi-cylindrical portion 11 as seen in the drawing is subdivided into a portion 12 comprising a segment of a wedge whose apex is at the center of the bore hole 10 and which subtends 30° at the apex. Still another portion of the earth formation 13 is shown in the form of a portion of wedge-shaped section having its apex at the center of the bore hole 10 and which subtends 15° at the apex. The portion 11 of the bore hole 10 and the first and second portions of 12 and 13, respectively, of the formation are represented by the potentiometric model shown in FIGURE 2.

Referring now to FIGURE 2, there is shown first, second, and third electrolyte pools 14, 15, 16 corresponding to the portion 11 of the bore hole 10 and first and second sections 12, 13, of the formation as shown above in FIGURE 1. The three pools 14, 15, 16 are contained within separate troughs of electrically insulating material. The first of the pools 14 is contained within an elongated first trough 17 of semi-circular cross-section. The second pool 15 is contained within a second trough 18 which may be in the general form of an annular segment whose center of curvature corresponds to that of the first tubular container 17 which represents the bore hole. Adjacent the second container 18, remote from the bore hole trough 17, there is shown a third trough 19 containing the third electrolyte pool 16 and which, likewise, is in the form of an annular segment whose center of curvature corresponds to that of the bore hole 14.

A plurality of discrete electrodes 20 are disposed along the inner surface of the generally cylindrical non-conductive wall of the first trough 17. The electrodes 20 are disposed along the inner surface of the trough 17 containing the bore hole pool in contact with the electrolyte in such manner as to provide equi-potential electric paths along successive discrete arcs disposed generally perpendicular to the longitudinal axis of the bore hole. A plurality of corresponding electrodes 21 are disposed along the inside wall of the annular segment shaped second trough 18 containing the second electrolyte pool 15. The electrodes 21 are electrically connected to the corresponding electrodes 20 of the bore hole pool 14 as by means of appropriate conductive bridging member 22. A plurality of discrete electrodes 23 are likewise disposed in generally parallel relation and generally transverse to the bore hole axis along the inner wall of the outer wall of the second trough 18 confining the second pool 15, and are, in turn, electrically connected as by bridging members 24 to a plurality of corresponding parallel electrodes 25 that are disposed along the inner surface of the inner wall of the third trough 19 confining the third electrolyte pool 16. The outermost wall of the third trough 19 is provided on its interior surface with a conductive terminating electrode member 26 in order that it may function as an equipotential terminating electrode for the system. Similarly, the outside or end walls of the first trough 17, second trough 18 and third trough 19, are provided on their respective inside surfaces with suitable conductive terminating electrode members, 17a, 18a, 19a, respectively. In order to provide a common terminating reference potential, which may be designated ground, for example, the respective terminating electrode members 17a, 18a, 19a, 26 are electrically coupled together, as by means of wire conductors 27 soldered to adjacent ones, as shown. Instead of providing insulating end-walls with a terminating sheet-like electrode member, such as 26, it may be desirable in certain cases to form the end-walls themselves of conductive metal or the like.

The electrodes 20, 21, for example, disposed within the various troughs may comprise metal members that are inserted in discrete grooves provided in the surface of the insulating trough walls. Such electrode members may advantageously comprise from 10 to 32 strips per linear inch lengthwise of the wall and be separated from one another from about .01 inch to .005 inch in width. The area of the wall covered by the conductors should be of the order of at least 5 times the area of the insulated space between the conductors. In accordance with another way of carrying out the invention, the electrodes 20, 21, etc. of the various troughs may be coated or plated on the inside of the respective troughs in accordance with known printed-circuit techniques. In certain instances the bridging members, 22, 24 may comprise metal loop members, as shown, for interconnecting the respective electrode members. Especially in the case of printed circuit type electrodes, the bridging members may comprise conductive rivets (not shown) joining the opposing electrodes through the insulating wall.

In accordance with another technique, as shown in FIGURE 3, the barrier between adjacent electrolyte pools may comprise an insulating wall having a plurality of spaced, mutually insulated conductors 22' and 24' of generally U-shaped configuration draped thereover with the two ends thereof in contact with the respective electrolytes to function as electrodes. In such case, the length of the respective legs of the U-member should be chosen to provide the desired electrolyte contact, as herein discussed.

Referring again to FIGURE 2, a supporting member 30, positioned generally along the axis of the bore hole pool 14, is shown supporting a plurality of central electrode members 31–35 adapted and arranged to contact the electrolyte comprising the bore hole pool 14 at desired positions along its axis. In accordance with known-techniques, certain of the electrodes of the apparatus may be coupled to a source of electric current in order to produce effects in the model which may be measured as by means of other of the electrodes of the apparatus, including the electrodes 31–35 disposed along the axis of the bore hole pool 14, in known manner as discussed, for example, in the aforementioned patent to Lee and Herzog.

By way of illustration, as shown in FIGURE 2, a constant current source of potential 40, conventionally alternating current, is shown applied between the electrodes representing the outer boundary of the system, analogous to ground potential, and the central electrode member 31. A high impedance voltage sensitive recorder 41 is shown coupled between two of the central electrodes 34 and 35. By measuring the potential produced between the electrodes 34 and 35 in response to the applied voltage between ground and the member 31, for example, valuable information concerning the electrical characteristics of the system may be determined. In order to simulate an electric logging instrument passed through a bore hole, the central electrodes 31–35 may be mounted to a unitary structure for movement along the axis of the bore hole in a manner comparable to that of the passage of an electric logging sonde through an earth bore. In such case, the electrodes 31–35 may be fixedly secured to a common mounting member in order to assure that the spacing between respective ones remains constant throughout the test.

As shown in FIGURE 2, and in order to represent various formations of different electrical characteristics along a bore hole, electrolyte pools representing the formation may be divided into compartments along the bore hole axis, as by means of the barriers 42, 43. It is to be understood that these barriers 42, 43 are so constructed as to transmit electricity thereacross at discrete mutually insulated locations throughout their length, as set forth, for example, in the aforesaid patent to Lee and Herzog.

Preferably, in accordance with the invention, the conductivities of the electrolytes comprising the various pools 14, 15 and 16 should be selected such that the conductivities of the successive pools, proceeding outwardly from the bore hole, are increased by a factor that is inversely proportional to the number of radians subtended by the respective bridging electrodes contacting adjoining electrolyte pools. Thus, in the embodiment of FIGURE 2 the conductivity of the pool 15 representing the first section of the formation should be increased by a factor of six (6) over that which the represented formation would otherwise be as compared with the conductivity of the bore hole represented by the pool 14. Likewise, the conductivity of the second section of the formation 16, should be twice that which it would otherwise be as compared with that of the preceding section 15. Accordingly, in the case of homogeneous resistivity simulation, the actual conductivity of the first formation pool 15 would be six (6) times that of the bore hole pool 14 and the second formation pool 16 would be twice that of the first formation pool 15. These relationships follow from the fact that the bore hole pool 14 subtends 180°, whereas the first and second formation pools 15, 16, subtend 30° and 15° respectively.

In considering the theory of operation of the above-described apparatus as applied, for example, to the analysis of one or more earth formations about a bore hole, it is noted that changes in lithology about a well bore of fixed diameter are maintained for relatively large distances perpendicular to the well bore center line as compared with the well bore diameter, wherefore it may be assumed that the voltage and current distributions are substantially symmetrical about the center line of the bore hole. That is to say, flow lines of electrical current do not cross any plane containing the center line of the well bore. Although such flow lines may have excursions parallel to the well bore center line or radial excursions, no component is concentric with the well bore wall.

Considering the system in terms of equi-potential surfaces, it may be shown that at any point on such a surface there exists a tangent line orthogonal to a plane containing the well bore center line with the added feature that such surfaces are normal to the well bore center line at their points of intersection. It is this symmetry which permits representation of the entire electric system of 360° about the well bore center-line by means of a wedge-shaped space included between two insulating planes intersecting on the center line. As in the case of a wedge-shaped model, for example, the insulating planes may be the insulating bottom of the model and the upper surface of the electrolyte pool exposed to the air, the center line being horizontal.

By way of illustration, there is shown in FIGURE 4 an equivalent electrical circuit representative of a plane defined by a slice transverse to the axis of the bore hole. The various resistances 50 shown radiating from the longitudinal axis 51 of the bore hole represent the resistivity of the electrolyte comprising the bore hole pool 14 along radial paths in directions proceeding from the center of the bore hole to various places along one of the electrodes 20. The conductor 52 represents a bridging member 22 connecting the electrodes 20 to the electrodes 21. The resistance elements 53 represent the resistance of various radial paths through the electrolyte of pool 15 between the inner and outer electrodes 21 and 23 of the first formation electrolyte pool 15. Similarly, the conductor 54 represents a bridging member between the first and second formation pools 15, 16 coupling the electrodes 23 and 25. The resistance element 55 represents the resistance of a radial path through the electrolyte of pool 16 between one of the electrodes 25 and the electrical termination of the model remote from the bore hole, which may comprise the equi-potential electrode 26, adjacent the outermost wall of the third trough 19, forming the outer boundary of the model remote from the bore hole.

In view of the above, it is not necessary to limit the number of insulating planes containing the center line that may be installed in a given model, since there are an infinite number available. Thus, if we are to consider, for example, 360 very thin insulating planes each containing the well bore center line and spaced 1° apart, such planes would introduce no distortion in the flow or potential lines in the electrical system as described above. The system may, therefore, be thought of as 360 electrically parallel paths for current flow.

Based on the foregoing, and in accordance with the invention as described above, the bore hole and surrounding formation may be represented by a potentiometric model wherein the bore hole electrolyte pool may be 360° or less, say 180°, and wherein the formation adjacent the bore hole may be represented by one or more electrolyte pools of successively lesser angular size, as considered in a direction perpendicular to the bore hole centerline, provided that electrical symmetry be provided by means of a suitable electrical coupling between the successive electrolyte pools. Such coupling is provided by means of the parallel electrodes of the apparatus described above.

In carrying out a specific embodiment of the invention as described above, it has been found desirable to employ 180 of 1° paths for the first ⅜ inch, say, outside from the central line; 30 paths for the next 12 inches, say; 15 paths for the next few feet; and so on. In such manner, the size and weight of the model may be reduced considerably, as compared with a model in which all 180 paths are carried out to several feet from the center line.

It is noted particularly, however, that the contact electrodes of the respective electrolyte containers or troughs must couple the entire 180° to the entire 30° of a 180-30° type system, and so on, the entire 15° of a 15° trough, for example, if additional electrolyte pools are employed.

Inasmuch as the electrodes coupling the various electrolyte pools contacts successively lesser amounts of electrolyte, the conductivity of the successive pools should be increased by the same factor as the reduction in electrolyte contact from pool to pool. Thus, for the case of simulating a homogeneous medium the aforementioned factor represents the ratio of the actual resistivity of the respective electrolyte. The relationship between the conductivity of the electrolyte in the various pools (for the case of homogeneous resistivity simulation), and the provision of contacting the entire angle subtended by such pools at their cylindrical boundaries for the purpose of connecting contiguous concentric cylindrical annular segments, is concerned with the fact that the same amount of current must be made to flow through each of the one degree paths simulated by each of the pools as such a unit current sheet is extended outward from the well bore through the various electrolyte pools. This aspect of the invention may be better appreciated by referring to FIGURE 4, which illustrates such a circuit path. For one embodiment of the invention utilizing a flow of electrical current from a current electrode installed on the well bore center line to the equipotential sheet of the distant wall of the most remote compartment, an equivalent circuit for one increment of volume defined by two imaginary parallel planes perpendicular to the well bore center line through the current electrode is shown in FIGURE 4. In order to exhibit a uniform medium, the resistances of FIGURE 4 would have to be scaled; that is, the two equal resistors associated with trough 18 have to be different in value from the other resistors. To simulate the homogeneous medium, the ratio of the value of each of the 12 equal resistors of trough 17 to the value of each of the two equal resistors in trough 18 to the value of the single resistor in trough 19, should be 12:2:1. To simulate a non-homogeneous medium in which the formation adjacent to the well bore is a factor of five (5) greater in resistivity than the well bore, for example, the above ratios would be 12:10:5. A similar scaling is required for the specific volume resistivity of the electrolytes used in the troughs of the model of FIGURE 2.

Referring now to FIGURE 5, there is shown another embodiment of the invention similar to that of FIGURE 2, except for the fact that the bore hole is represented by a generally cylindrical tank 17' of substantially 360° and which is electrically connected to an electrolyte pool 15', similar to the pool 15 of FIGURE 2. As in the case of the apparatus shown in FIGURE 2, the interior of the bore hole trough 17' is formed of non-conductive or insulating material and has provided along its inside surface discrete, substantially parallel electrode members 20' generally transverse to the axis of the bore hole describing a plurality of substantially 360° arcs of radius substantially equal to that of the internal radius of cylindrical trough 17' and being displaced in longitudinal position along the length of trough 17'.

As in the apparatus of FIGURE 2, the electrodes 21' that are positioned along the inside of the mating surface of the formation trough 18' along substantially parallel arcs are, likewise, transverse to the axis of the bore hole. The interior walls of the electrolyte trough are of non-conductive material, except for the presence of the various electrodes. Still another electrolyte trough (not shown) subtending a smaller angle from the center of the bore hole, may also be employed to provide a suitable electrical termination for the system in a direction remote from the bore hole. In the event that further accuracy of an additional terminating trough is not required, the outermost wall of the formation trough may be comprised of electrically conductive material in order to provide an equi-potential termination. In any event, the outermost wall of the trough furtherest from the bore hole trough should preferably be conductive or have a conductive electrode adjacent thereto in order to provide a proper termination for the system. The end walls of the respective troughs should also be provide with conductive terminating electrodes, as discussed in regard to the apparatus of FIGURE 2.

In accordance with a further aspect of the invention, and with particular regard to the apparatus of FIGURE 5, the respective troughs of the system need not be in contiguous physical relation, provided the construction is such that they otherwise are of the proper physical relationship and provided also that a suitable electrical connection is provided between the corresponding electrodes in order to couple the electrolytes of the respective troughs.

Although the electrolyte pools representing the well bore and formation(s) of the above-described models may bear a linear relation, it is also contemplated within the scope of the invention to provide pools of different linear scale relationship in the event that it is so desired.

Referring now to FIGURE 6, there is shown a potentiometric model of a well bore and adjacent formation generally like the apparatus shown in FIGURE 5, except that this apparatus represents a non-identical linear scale relationship between the well bore and formation. In this embodiment the bore hole trough 17' is longer by a predetermined factor than the trough 18' representing the formation. Moreover, the conductive electrode members 20" of the bore hole trough are wider than the corresponding electrode members 21' of the formation trough. The bore hole electrodes differ in width from the corresponding formation electrodes by the same scale factor as that by which the two compartments differ.

Referring now to FIGURE 7, there is shown a detailed view illustrating a portion of an apparatus similar to that of FIGURES 2 and 3, wherein the bridging members comprise a conductive bridging cloth 60 formed of vertical conductive threads interwoven with transverse non-conductive threads in such manner as to provide a plurality of discrete substantially parallel electrodes that are maintained in appropriate spaced relation. Such bridging members may be conveniently draped over the barrier in order to contact the desired electrolyte comprising the respective pools of the system over the desired surface area, as discussed above, especially in regard to FIGURE 2.

As shown in FIGURE 8, the bridging cloth may appropriately comprise a plurality of conductive members such as fine wire 61 interwoven with transverse non-conductive members 62 of nylon or the like. Though not ordinarily necessary, it may be desirable in certain instances to employ additional vertical insulating members 63 alternately with conductive members 61 in order further to insure electric isolation between the vertical conductors.

Referring now to FIGURE 9, there is shown a further embodiment of the invention generally like that of FIGURE 2, and illustrating a first electrolyte pool subtending 180° and having adjacent thereto a generally annular second pool subtending 30° at the center of the bore hole pool. The apparatus is particularly distinct from that of FIGURE 2, in that the outer or formation pool is further provided with a central region, as considered along the axis of the bore hole pool, of shallower depth than the two end portions thereof. The electrolyte in the bore hole pool is coupled to the electrolyte of the formation pool by means of electrical bridging members in a manner similar to that shown in FIGURE 2. However, rather than an insulating barrier member between the central or shallow region of the formation pool and the outer or deeper regions thereof there is provided an electrical coupling along the plane dividing the regions of different depth that comprises a plurality of discrete electrode members 75 extending from the surface of the electrolyte in the pool to the bottom of the deeper portion of the pool and which is in contact with both the shallow and deeper portions throughout their entire depth at the place where the two regions meet, such electrodes being fashioned in the form of arcs about the well bore center line.

By this arrangement, varying resistivities of adjacent portions of an earth formation for example, may be represented through use of an electrolyte of homogeneous resistivity, merely by selecting the ratio of the angular depths of two adjacent regions in proportion to the desired resistivity ratio. It is important, however, that the bridging electrodes coupling regions of different depth, representative of different formation resistivities, extend from the surface of the electrolyte to the bottom of the shallow pool and continue on to the bottom of the deeper pool in order to afford proper electrical coupling.

Referring to FIGURE 10, there is shown a further illustration of this feature of the invention. In FIGURE 10, there is shown a stepped electrolyte pool 80 having a shallow portion 81 adjacent a deeper portion 82 and wherein a plurality of generally perpendicular electrodes 83 are shown extending from the surface of the electrolyte to the bottom of the deeper of the two regions, along the plane of separation of the two regions. The coupling electrode members 83 in such case may be comprised of rigid metal rods or strip members capable of being self-supporting, as shown. Likewise, the electrodes 83 may comprise a plurality of mutually insulated thin wire-like members (not shown) individually suspended from an insulating supporting member positioned across the top of the electrolyte pool along the plane of the intersection of the two electrolytes. As in the case of the self-supporting rods, it is important that the individual suspended electrode members extend from the surface of the electrolyte to the bottom of the deeper of the two regions.

It is further contemplated in accordance with the invention, especially as illustrated in FIGURES 9 and 10, that electrolyte regions of different depth may be provided in an otherwise constant depth trough by inserting a fluid-displacing insulating member of appropriate size and shape. This technique may also be employed to modify the effective angle of the bore hole trough. Thus, the resistivity of the well-bore electrolyte may be reduced for a given test merely by the insertion of a fluid-displacing insulating cylindrical segment of the appropriate size. The use of a fluid-displacing member to modify a bore hole trough, is illustrated in FIGURE 11 wherein an insulating fluid-displacement member 90 is shown in the form of a segment of a cylinder positioned along the axis of the bore hole trough, otherwise like that of FIGURE 9.

In the operation of the apparatus of the present invention, it is noted that various techniques may be employed in the analysis of a system represented by the model, including those set forth in the aforementioned patent to Lee and Herzog. For example, the penetration of well fluid into surrounding earth formations may be represented by introducing an additional barrier into one or more of the formation compartments in order to provide a subcompartment along the desired portion of the bore hole having appropriate conductivity analogous to the portion of the formation invaded by the drilling fluid. It is further contemplated, in cases where the apparatus comprises a series of bore hole compartments extending outwardly from the bore hole as in FIGURE 2, that invasion of a portion of the formation may be represented by employing electrolyte having the desired electrical characteristic in the bore hole compartment adjacent the well bore, such as the compartment 18 of FIGURE 2.

It will be understood, in view of the foregoing, that the concept of using only a convenient number of parallel paths to represent a whole system can be applied to any potentiometric model where symmetry allows one to insert insulating planes in the model without producing substantial distortion. The complementary case would be to install equi-potential surfaces in locations unaffected thereby to connect a convenient number of paths in series.

Among the advantages that will be appreciated by those skilled in the art, is the reduced effect of evaporation during the course of a series of measurements in view of the increased length of bore hole electrodes possible with apparatus herein set forth, as compared with the conventional wedge-shaped apparatus wherein the bore hole is represented by a comparatively shallow electrolyte pool.

While certain specific embodiments have been shown and described, it will be understood that various modifications may be made without departing from the principles of the invention. The appended claims are, therefore, intended to cover any such modifications within the true spirit and scope of the invention.

I claim:

1. A potentiometric model comprising a plurality of adjacent pools of electrolyte representative of a radial system to be studied, such as a bore hole through one or more earth formations, comprising a first container in the form of at least a segment of generally cylindrical configuration containing a pool of electrolyte representing a first portion of said system, a second container in the form of a generally annular segment containing a second pool of electrolyte and representing a second radial portion of the system adjacent said first portion, said annular segment subtending a significantly fewer number of radians than the generally cylindrical first container, the electrolyte of the first container being contacted by a plurality of discrete electrodes disposed along the inner surface of the generally cylindrical wall of the container, a corresponding plurality of electrodes disposed along the mating surface of the second electrolyte container, and means for electrically coupling the respective corresponding electrodes.

2. A potentiometric model comprising a plurality of adjacent pools of electrolyte representative of a radial system to be studied, such as a bore hole through one or more earth formations, comprising a first container in the form of at least a segment of generally cylindrical configuration containing a pool of electrolyte representing a first portion of said system, a second container in the form of a generally annular segment containing a second pool of electrolyte and representing a second radial portion of the system adjacent said first portion, said annular segment subtending a significantly fewer number of radians than the generally cylindrical first container, the electrolyte of the first container being contacted by a plurality of discrete electrodes disposed along the inner surface of the generally cylindrical wall of the container along arcs generally perpendicular to the axis of the first container, a corresponding plurality of electrodes disposed along the mating surface of the second electrolyte container, means for electrically coupling the respective corresponding electrodes, and being further characterized in that the conductivity of the electrolyte in the second container is increased in relation to that of the first container by a factor inversely proportional to the number of radians subtended by the second container as compared with that of the first container.

3. A potentiometric model comprising a plurality of adjacent pools of electrolyte representative of a radial system to be studied such as a bore hole through one or more earth formations, comprising a first container in the form of at least a segment of generally cylindrical configuration containing a pool of electrolyte representing a first portion of said system, a second container in the form of a generally annular segment containing a second pool of electrolyte and representing a second radial portion of the system adjacent said first portion, said annular segment subtending a significantly fewer number of radians than the generally cylindrical first container, and bridging means for electrically coupling the electrolyte contacting substantially the entire inner surface of the generally cylindrical wall of the first container to the electrolyte contacting substantially the entire inner surface of the mating wall of the second container.

4. The apparatus of claim 3 wherein the bridging means comprises a cloth formed of transverse members including a plurality of mutually insulated generally parallel conductive members whose opposite ends are disposed in the respective electrolyte pools.

5. The apparatus of claim 1 wherein said first and second containers comprise separate and distinct units situated in spaced relation with respect to one another.

6. The apparatus of claim 5 wherein the respective containers bear a predetermined non-linear relationship with respect to one another along the longitudinal axis thereof and wherein the electrodes of the respective containers bear substantially the same width relationship with respect to one another as the length of the respective containers to one another.

7. In a potentiometric model representing a physical system including first and second portions having an interface, the combination comprising first and second bodies of electrolyte representing said first and second portions respectively of said systems, each of said bodies of electrolyte having a side representing the surfaces of said first and second portions at said interface, said sides having an unequal length in one dimension, and means for providing at least one equipotential line throughout and in the direction of said one dimension of each of said sides and for interconnecting the corresponding equipotential lines of said two sides.

8. In a potentiometric model representing a radial system including first and second portions having a cylindrical interface the combination comprising first and second bodies of electrolyte in the form of at least a segment of generally cylindrical configuration representing said first and second portions respectively of said system, each of said bodies of electrolyte having a side representing the surfaces of said first and second portions at said interface, said sides being in the form of arcs subtended by unequal angles, means for providing at least one equipotential line throughout and in the direction of said arc of each of said sides and means for interconnecting the corresponding equipotential lines of said two sides.

9. A potentiometric model as set forth in claim 1 wherein the periphery of said first container is in the form of an arc subtended by an angle of 180° and wherein the cylindrical sides of said second container are in the form of arcs subtended by an angle of 30°.

10. In a potentiometric model of a borehole and adjacent earth formations, wherein the borehole is represented by an elongated trough containing an electrolyte and a formation is represented by an adjacent second trough of electrolyte, with means at spaced intervals for electrically coupling the two troughs across the barrier separating the two troughs but not longitudinally thereof, the improvement wherein the elongated trough representing the borehole has a generally semi-circular cross-section and the adjacent trough representing the formation is in the general form of an annular segment whose center of curvature corresponds to the center axis of said trough of semi-circular cross-section.

11. The improvement in a potentiometric model as set forth in claim 10 wherein said adjacent trough has a bottom formed as an inclined plane surface.

12. The improvement in a potentiometric model as set forth in claim 10 wherein said potentiometric model also has a third trough of electrolyte representing still another portion of the formation, said third trough being adjacent the outer side of said second trough remote from said semi-circular trough, said third trough also being in the general form of an annular segment whose center of curvature corresponds to the center axis of said trough of semi-circular cross-section.

13. The improvement in a potentiometric model as set forth in claim 12 wherein said third trough has a bottom formed as an inclined plane surface of different inclination from the inclination of the plane surface of the second trough.

References Cited in the file of this patent

UNITED STATES PATENTS

| | | |
|---|---|---|
| 2,381,218 | Jacob | Aug. 7, 1945 |
| 2,433,239 | Rasero | Dec. 23, 1947 |
| 2,547,950 | Lee et al. | Apr. 10, 1951 |
| 2,661,897 | Herzog et al. | Dec. 8, 1953 |
| 2,824,689 | Aronofsky | Feb. 25, 1958 |